United States Patent [19]
Bass et al.

[11] Patent Number: 6,102,646
[45] Date of Patent: Aug. 15, 2000

[54] LAWN MAINTENANCE TRUCK WITH HYDRAULICALLY POWERED RAMP

[76] Inventors: Anthony C. Bass, 103 St. John's Way, Warner, Robbins, Ga. 31093; Luther C. Bass, P.O. Box 91, Bonaire, Ga. 31005

[21] Appl. No.: 09/362,872

[22] Filed: Jul. 29, 1999

[51] Int. Cl.[7] ............................. B60P 1/00; B62D 33/02; B62D 33/04
[52] U.S. Cl. ...................... 414/537; 414/557; 296/57.1; 296/61
[58] Field of Search .................................... 414/537, 545, 414/566, 557; 296/57.1, 61

[56] References Cited

U.S. PATENT DOCUMENTS

| | | | |
|---|---|---|---|
| 3,580,404 | 5/1971 | Moser | 414/537 |
| 4,084,713 | 4/1978 | Rohrs et al. | 414/537 |
| 4,475,761 | 10/1984 | Milroy et al. | 414/537 |
| 4,787,809 | 11/1988 | Zrostlik | 414/557 |
| 4,944,546 | 7/1990 | Keller | 296/61 |
| 4,979,867 | 12/1990 | Best | 414/537 |
| 5,156,432 | 10/1992 | McCleary | 296/61 |
| 5,205,010 | 4/1993 | Hageman | 14/71.7 |
| 5,540,474 | 7/1996 | Holland | 296/61 |
| 5,597,195 | 1/1997 | Meek | 296/61 |
| 5,678,984 | 10/1997 | Petersen | 414/537 |
| 5,791,717 | 8/1998 | Reich et al. | 414/537 |
| 5,829,947 | 11/1998 | Litten | 340/425.5 |
| 5,907,276 | 5/1999 | Lance . | |
| 5,941,677 | 8/1999 | De Boer | 414/557 |

*Primary Examiner*—Robert P. Olszewski
*Assistant Examiner*—Paul T. Chin
*Attorney, Agent, or Firm*—Nixon & Vanderhye P.C.

[57] ABSTRACT

A truck for transporting and/or storing lawn care equipment such as self-propelled lawn mowers, tools, and the like. The truck includes a hydraulically powered ramp which enables such mowers to be driven onto and off of the truck. Optionally, the ramp may also function as a rear door for closing and/or locking the truck bay. In certain embodiments, structure is provided within the truck's bay for allowing hand tools to be vertically stored and supported by bay walls during transport.

5 Claims, 9 Drawing Sheets

LAWN MAINTENANCE TRUCK WITH HYDRAULICALLY POWERED RAMP

This application relates to a truck including an area for lawn care equipment to be stored and/or transported. More particularly, this invention relates to a lawn care equipment truck including a hydraulically powered ramp for enabling self-propelled power mowers and the like to be driven into (and out of) a rear storage area of the truck.

BACKGROUND OF THE INVENTION

Ramps attachable to the rear of a truck are known in the art. For example, see U.S. Pat. Nos. 4,979,867; 5,156,432; and 5,678,984, the disclosures of which are incorporated herein by reference. Unfortunately, conventional ramps are not particularly well-adapted for enabling self-propelled power lawn mowers and the like to board trucks. Some conventional ramps are shaped undesirably, others are not strong enough, others may cause low hanging cutter decks of such mowers to scrape the ramp or truck, others may require multiple persons to operate, and others are inefficient.

It is apparent from the above that there exists a need in the art for a more efficient ramp structure for enabling self-propelled lawn mowers (e.g. see U.S. Pat. Nos. 4,878,339 and 5,507,138, the disclosures of which are hereby incorporated herein by reference) to be driven into and off of a corresponding truck for transporting the same. There also exists a need in the art for such a ramp which also functions as the rear gate/door of such a truck.

It is a purpose of this invention to fulfill any and/or all of the above-described needs in the art, as well as other needs which will become apparent to the skilled artisan from the following detailed description of this invention.

SUMMARY OF THE INVENTION

It is an object of this invention to provide a ramp structure for enabling self-propelled lawn mowers, with cutter decks hanging as low as from about 1 to 4 inches off of level ground, to be driven onto and off of (or into and out of) the rear of a truck.

Another object of this invention is to provide such a ramp which functions as the lockable rear gate/door of such a truck, in addition of performing ramp functions.

Another object of this invention is to provide a ramp including two pivotally connected sections, each being extendable by a separate hydraulic cylinder.

Another object of this invention is to provide a ramp structure for attachment to a truck, where the ramp structure can also function as a work platform when the distal ramp platform is aligned approximately perpendicular to substantially flat ground.

Another object of this invention is to provide a ramp structure for attachment to a truck, which ramp structure can be operated by a single person.

Another object of this invention is to provide as two section pivoting ramp of heavy duty steel construction which also functions as a rear door of a truck bay.

Another object of this invention is to provide an efficient method of opening and closing a ramp structure attached to a rear portion of a truck.

Another object of this invention is to provide a system and/or apparatus for efficiently storing hand tools (e.g. rakes, shovels, sledge hammers, and the like) on walls of the interior of a truck bay so that self-propelled mowers can also fit easily into the bay along with the tools.

Another object of this invention is to fulfill any and/or all of the above-listed objects of this invention.

This invention further fulfills any or all of the above-described needs in the art by providing a truck including a ramp structure comprising:

a truck frame;

a truck bay including upstanding sidewalls and a roof, and a rear bay opening defined at a rearward portion of the bay;

a ramp structure pivotally connected to the truck at a rearward end thereof, the ramp structure comprising:
 (a) a first ramp pivotally connected to the truck via at least one hinge;
 (b) a second ramp pivotally connected to the first ramp, wherein the first ramp is substantially longer in length than the second ramp;
 (c) a first hydraulic cylinder pivotally connected between a frame extension and the first ramp;
 (d) a second hydraulic cylinder pivotally connected between the first and second ramps so as to allow the second ramp to be selectively moved between a folded up position and an extended position where the first and second ramps are approximately coplanar;
 (e) the frame extension extending rearwardly of, and at an elevation below, a pivot axis defined by the at least one hinge that pivotally connects the first ramp to the truck, wherein a first cylinder pivot axis is defined where the first cylinder is pivotally connected to the frame extension, and wherein the first cylinder pivot axis is located rearwardly of and at an elevation below the at least one hinge that pivotally connects the first ramp to the truck; and
 (f) wherein the first ramp is selectively moveable by the first cylinder between (i) a closed position where the first cylinder closes the rear bay opening, and (ii) an open position for enabling self-propelled lawn mowers to be driven into and out of the bay.

This invention will now be described with respect to certain embodiments thereof, along with reference to the accompanying illustrations.

IN THE DRAWINGS

DETAILED DESCRIPTION OF CERTAIN EMBODIMENTS OF THIS INVENTION

Figure 1:
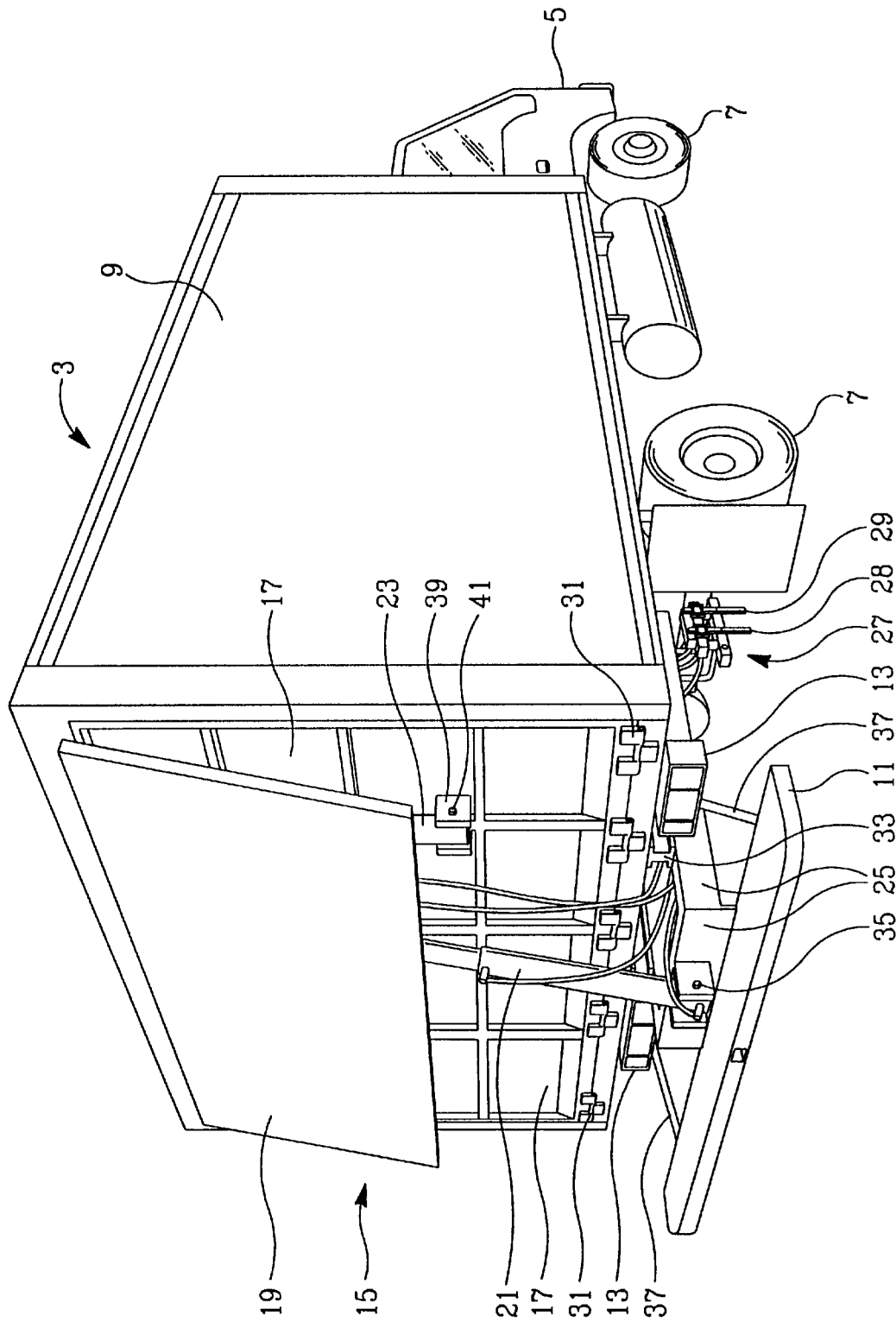
FIG. 1 is a perspective view of a lawn care equipment truck according to an embodiment of this invention.

Referring now more particularly to the accompanying drawings in which like reference numerals indicate like parts throughout the several views.

FIG. 1 is a perspective view of truck 3 adapted for transporting and housing/storing lawn care equipment such as self-propelled lawn mowers, shovels, rakes, sledge hammers, and the like. Truck 3 includes cab 5, wheels 7, hauling bay or box 9 which may be entirely enclosed during transport, rear bumper 11, rear tail lights 13, and selectively deployable ramp structure 15.

Ramp structure 15 includes first ramp platform 17, second ramp platform 19 which is pivotally connected to first ramp platform 17, primary hydraulic cylinder 21, secondary hydraulic cylinder 23, frame extension assembly 25, and ramp control system 27 including first and second handles/levers 28 and 29. Ramps or platforms 17, 19 may be made of sheet steel, aluminum, or the like, in certain embodiments. Ramps 17, 19 are each approximately planar in shape, or at least partially planar. First ramp platform 17 is substantially larger in size than second ramp platform 19 (e.g. at least 30% larger in area size, and preferably at least about 40% larger in area size), and is thus referred to as the primary ramp or platform. Because platform/ramp 19 is smaller, it is referred to as the secondary ramp or platform. Likewise, cylinder 21 is substantially larger and/or longer than cylinder 23, and is thus referred to as the primary cylinder. It is recognized that in alternative embodiments, ramps 17 and 19 may be of approximately the same size. Also, cylinders 21 and 23 may be of the same size.

As illustrated in FIG. 1, primary ramp 17 is pivotally connected to a rear portion of the truck or a rear portion of bay 9 by way of axially aligned hinge members 31 which define a pivot axis that is approximately parallel to level ground. Anywhere between one and twenty such hinge members 31 may be provided, although approximately five is preferred. Frame extension assembly 25 is rigidly connected to a rear portion of truck frame 33. For example, extension assembly 25 may be connected to frame 33 by U-type bolts or the like. Frame members 33 may be part of the original truck frame as delivered from the factory, or alternatively may be accessory frame items added so that the extension assembly can be attached to the original truck frame. Thus, frame members 33 need not be part of the original truck frame as delivered from the factory, so long as they are rigidly connected thereto either directly or indirectly.

Primary hydraulic cylinder 21 is pivotally mounted to frame extension assembly 25 at pivot point/axis 35. Frame extension 25 enables pivot axis 35 to be located rearwardly of and at an elevation below the ramp 17 pivot axis defined by hinge(s) 31. Because of such positioning, ramp 17 can be pivoted from its closed position shown in FIG. 1 to an open position by an operator pushing lever 28 toward the truck frame so as to cause primary cylinder 21 to contract (i.e. become shortened due to the flow of hydraulic fluid from the cylinder). It is noted that in alternative embodiments, if the hoses were changed around, the ramp movements could be reversed with the same results occurring.

Bumper 11 is rigidly connected to the rear end of frame extension 25, and is mostly at an elevation below axis 35. Elongated bumper supports 37 are also connected between the front of the bumper and the frame of the truck. Alternatively, supports 37 may be connected between extension assembly 25 and the bumper.

Figure 4A:
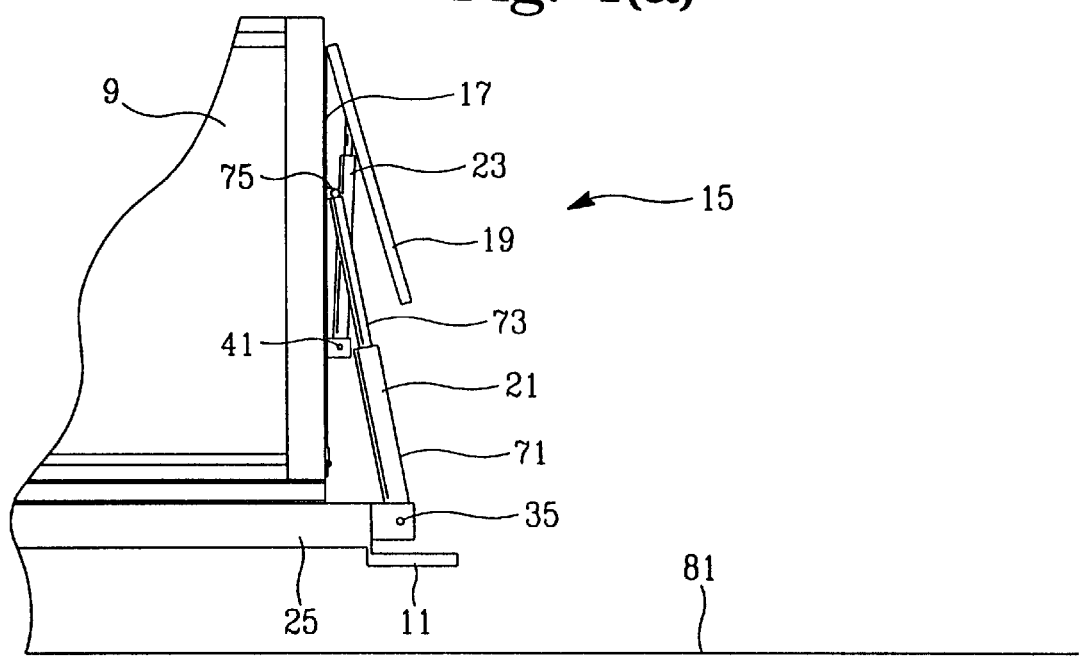
FIG. 4(a) is a side elevational view of the ramp structure of FIG. 1 in an up or closed position where the ramp is also functioning as the rear gate/door of the truck.
Figure 4B:
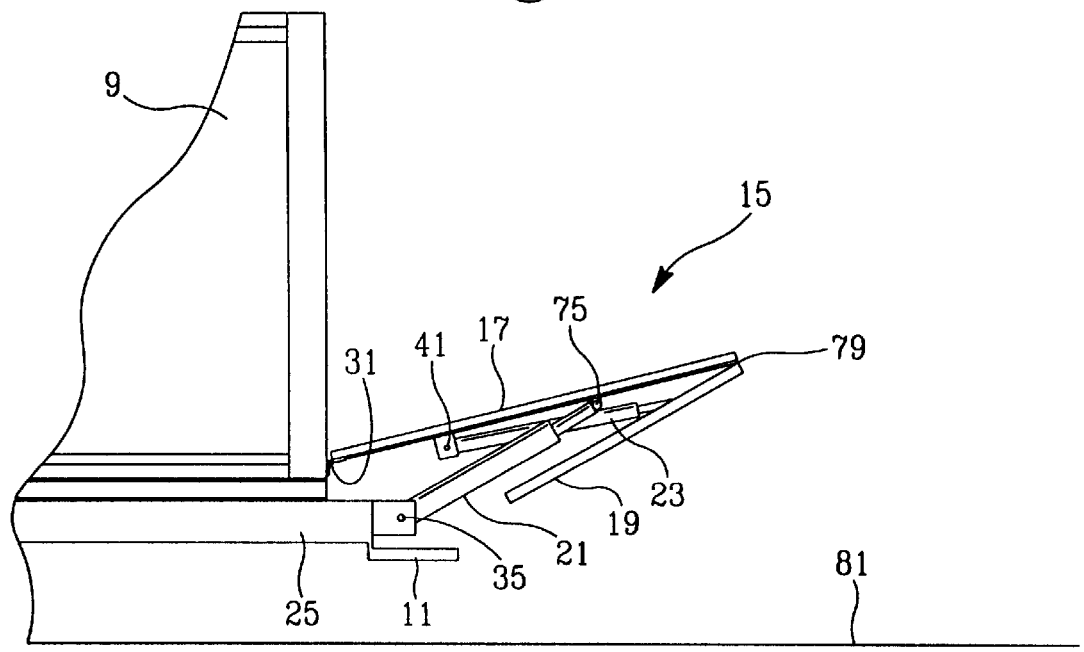
FIG. 4(b) is a side elevational view of the ramp structure of FIGS. 1 and 4(a) at a mid-point location in both the opening and closing process.
Figure 4C:
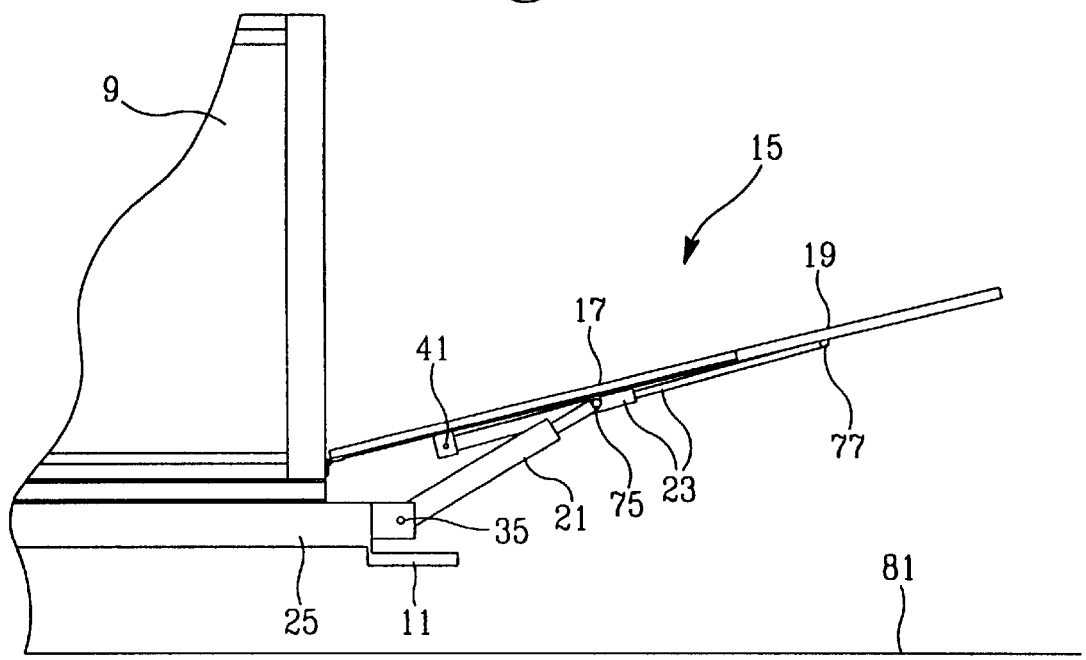
FIG. 4(c) is a side elevation view of the ramp structure of FIGS. 1 and 4(a)–4(b), located at another mid-point between opened and closed positions where the ramps are approximately coplanar.
Figure 4D:
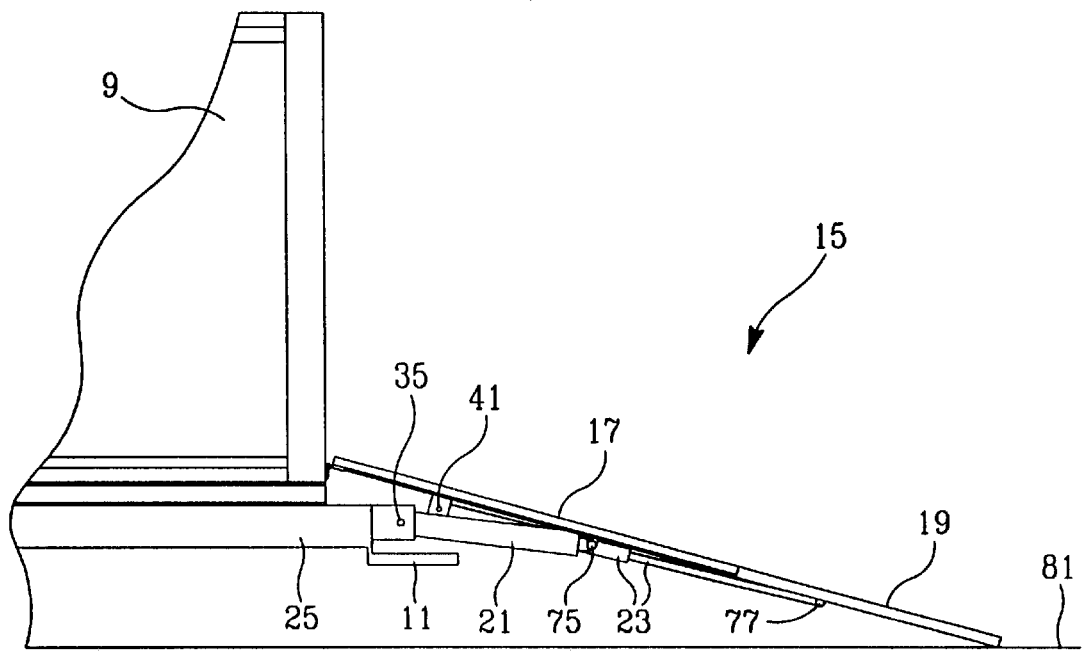
FIG. 4(d) is a side elevational view of the ramp structure of FIGS. 1 and 4(a)–4(c), in an open position resting on the ground for enabling self-propelled lawn mowers and the like to be driven into or out of the truck bay/box.

Bracket 39 is rigidly affixed to the underside of primary ramp 17 so as to mount secondary cylinder 23 thereto via pivot axis 41. The other end of cylinder 23 is pivotally connected to the underside of secondary ramp 19 at pivot axis 77 (e.g. see FIG. 4(d)). Thus, secondary ramp 19 can be extended from a closed position (e.g. see FIG. 1) to an open position when cylinder 23 is expanded (i.e. lengthened) due to the flow of hydraulic fluid thereinto.

Figure 2:
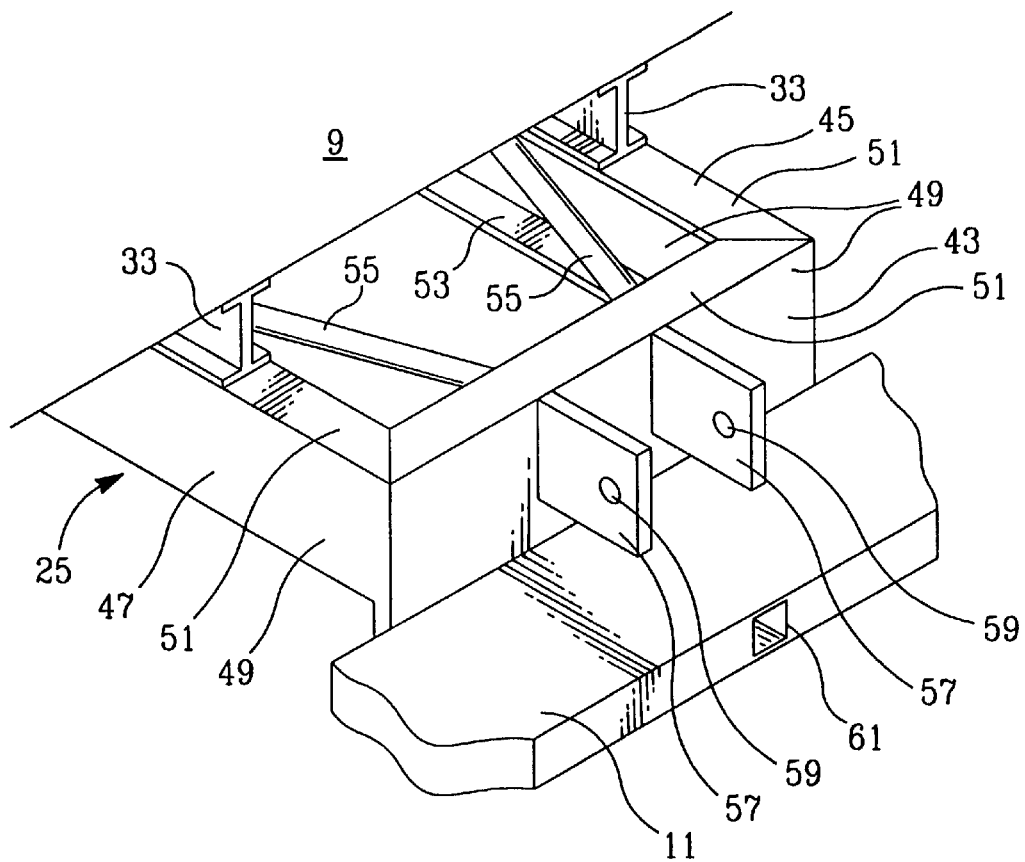
FIG. 2 is a fragmented perspective view of a frame extension assembly provided on the truck of FIG. 1, this extension for enabling a primary hydraulic cylinder to be pivotally mounted at a location rearwardly of the pivot point where the primary ramp is pivotally connected to the truck.
Figure 3:
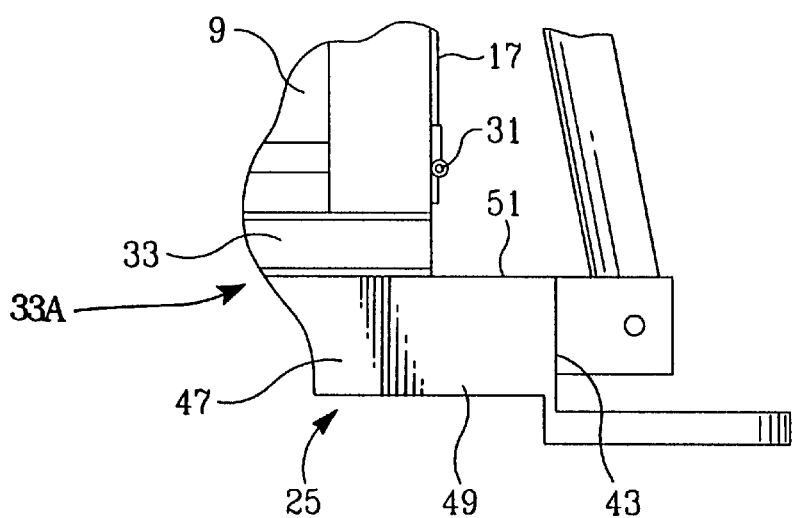
FIG. 3 is side elevation view of the frame extension assembly of FIG. 2, except that in FIG. 3 the primary hydraulic cylinder is illustrated while it is not in FIG. 2.

FIG. 2 is a perspective view of frame extension 25 assembly and rear bumper 11 rigidly connected thereto. FIG. 3 is a side elevational view of frame extension 25 and bumper 11, except that a portion of primary cylinder 21 is also shown in FIG. 3. Referring to FIGS. 2–3, frame extension assembly 25 includes first, second, and third rigid support members 43, 45, and 47, respectively. Support members 45 and 47 are oriented approximately parallel to one another. Support member 43, connected at opposite ends thereof to members 45 and 47, respectively, is oriented approximately perpendicular to both of support members 45 and 47. Each support member 43, 45, and 47 includes a vertically aligned sidewall portion 49 and opposing top 51 and bottom 53 wall portions which are oriented approximately horizontally. Members 43, 45 and 47 may be channel iron in certain embodiments, that approximately matches the truck frame rails in size. In certain embodiments, member 33A may be oak 1"×4" between the bay box and the frame extension assembly, for purposes of mounting the body to frame.

Elongated support members 55 may be rigidly connected between the truck frame extension members 45, 47 and the inside of sidewall 49 of support member 43, so as to support assembly 25 as it supports the weight of the ramp structure. First and second approximately planar walls 57 extend rearwardly from support member 43, with walls 57 including coaxial apertures 59 defined therein. Walls 57 are approximately parallel to one another, and are also approximately parallel to the sidewalls of support members 45 and 47. A bolt or other fastener may be inserted through apertures 59 to pivotally connect the bottom end of primary cylinder 21 to the bracket structure defined by walls 57, thereby defining primary cylinder pivot axis 35. Optionally, trailer hitch 61 may be provided in the rear portion of bumper 11.

As shown in FIG. 4(*a*), primary cylinder 21 includes coaxially aligned tubular housing 71 and annular bar 73 slidable therein. Cylinder 21 is pivotally connected between frame extension 25 and the underside of ramp 17 at pivot points 35 and 75. Meanwhile, secondary cylinder 23 also includes a coaxially aligned tubular portion and bar/rod portion slidable therein. Cylinder 23 is pivotally connected between the undersides of ramps 17 and 19 at pivot points 41 and 77 (e.g. see FIG. 4(*c*)). Additionally, ramp platforms 17 and 19 are pivotally connected to one another at pivot axis/point 79 via a hinge or the like (e.g. see FIG. 4(*b*)).

FIGS. 4(*a*)–4(*d*) illustrate steps taken in moving ramp structure 15 from a closed position (e.g. FIG. 4(*a*)) to a completely open position (e.g. FIG. 4(*d*)), according to one non-limiting embodiment of this invention. FIG. 4(*a*) illustrates the ramp structure in the closed position, where primary ramp 17 is also functioning as the rear door or gate of truck bay/box 9. In order to open the ramp structure, the operator pushes handle 28 inwardly toward the truck frame in order to cause hydraulic fluid to flow via hose 21B to (or from in alternative embodiments) primary cylinder 21 thereby causing cylinder 21 to contract or shorten. Shortening of cylinder 21 causes ramps 17 and 19 to be lowered from their position in FIG. 4(*a*) to the position in FIG. 4(*b*), as ramp 17 pivot downwardly about hinge axis 31 due to the shortening of the primary cylinder. When cylinder 21 is shortened, it also pivots downwardly (e.g. clockwise in FIGS. 4(*a*) –4(*d*)) about pivot axis 35. After cylinder 21 has contracted enough so as to cause primary ramp 17 to pivot an angle from the vertical of from about 10°–85° (most preferably from about 60°–85° as shown in FIG. 4(*b*)), then the contraction of cylinder 21 may be temporarily halted in single hydraulic pump embodiments. It is noted that ramp 19 must be opened before ramp 17 is lowered to an elevation which would prevent such ramp 19 opening when the ground would get in the way and block opening of ramp 19.

Figure 8:
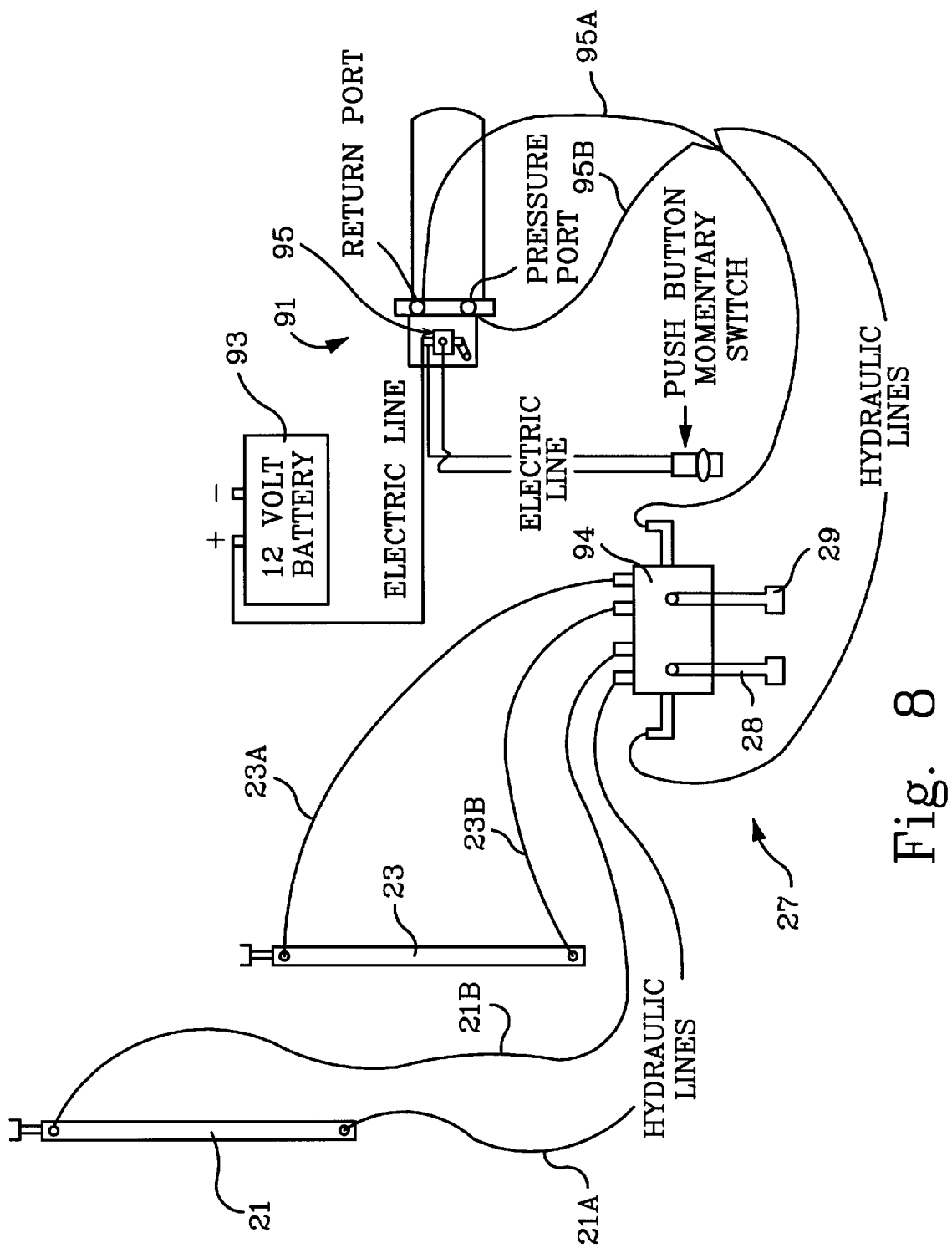
FIG. 8 is a schematic diagram of a hydraulic system for controlling the ramp structure of FIGS. 1 and 4 according to an embodiment of this invention.

When ramp 17 reaches approximately the position shown in FIG. 4(*b*), the operator returns lever 28 to its neutral position and pulls outwardly on lever 29 in order to cause hydraulic fluids to flow into secondary cylinder 23 via hose 23B (e.g. see FIG. 8). This causes cylinder 23 to expand or lengthen, which in turn causes secondary ramp 19 to pivot outwardly about interface axis 79 from its FIG. 4(*b*) position to its fully extended position shown in FIG. 4(*c*) where the two ramps 17, 19 are approximately coplanar with one another near their interface. In single pump embodiments, after cylinder 23 has been extended and secondary ramp 19 is approximately parallel or coplanar (i.e. ±5°–10°) with primary ramp 17 as shown in FIG. 4(*c*), then the operator returns lever 29 to its neutral location and again pushes lever 28 to cause primary cylinder 21 via hydro line/hose 21B (e.g. see FIG. 8) to contract or shorten in length. This latter shortening of cylinder 21 causes ramps 17 and 19 to pivot from the position shown in FIG. 4(*c*) downwardly to the position shown in FIG. 4(*d*) where the distal end of secondary ramp 19 ends up resting on ground 81. Thus, in order to lower the ramp structure to the ground from its FIG. 1 closed position, the cylinders are caused to operate in opposite directions/manners so that one lengthens and the other shortens.

In alternative embodiments of this invention, instead of utilizing a single hydraulic pump (e.g. see pump 91 in FIG. 8) for controlling both cylinders 21 and 23, a pair of pumps may be utilized, one for each cylinder. In dual pump embodiments, secondary cylinder 23 may be extended at the same time that primary cylinder 21 is being contracted. This may permit the ramp structure to be lowered and raised in a more efficient and time efficient manner, and both cylinders can be controlled at once in different directions.

In order to raise ramp structure 15 from an open position (FIG. 4(*d*)) to a closed position (FIG. 4(*a*)), the following steps may be taken according to certain embodiments of this invention. First, lever 28 may be pulled outwardly by the operator in order to cause hydraulic fluid to flow into primary cylinder 21 via hydro hose 21A (e.g. see FIG. 8), thereby causing cylinder 21 to expand or lengthen as rod 73 slides outwardly from tubular member 71. Because cylinder pivot axis 35 is at an elevation below and approximately parallel to hinge axis 31, lengthening of cylinder 21 using handle 28 causes ramp 17 to pivot upwardly (i.e. counter-clockwise as shown in FIGS. 4(*c*) and 4(*d*)) about hinge axis 31 so that the distal end of ramp 19 is lifted off of the ground. Primary cylinder 21 may be lengthened until the ramps 17, 19 are high enough so that ramp 19 can be pivoted underneath of ramp 17 without hitting the ground (e.g. to the FIG. 4(*c*) mid-point position). After ramps 17, 19 reach such a height, in single pump embodiments the expansion of cylinder 21 is temporarily stopped and the operator pushes lever 29 in order to cause cylinder 23 via hydro hose/line 23A to contract or shorten. When cylinder 23 shortens, this causes secondary ramp 19 to pivot downwardly about interface axis 79 so as to fold beneath primary ramp 17 (i.e. causes ramp 19 to pivot from the FIG. 4(*c*) position to the FIG. 4(*b*) position). Once secondary ramp 19 is pivoted underneath of primary ramp 17, then the operator again causes cylinder 21 to lengthen or expand, which in turn causes the ramps to pivot upwardly about hinge axis 31 from the FIG. 4(*b*) position to the FIG. 4(*a*) closed position.

In alternative embodiments, the ramp structure may be opened by first shortening cylinder 23 via hydro line 23A when the structure is in the FIG. 4(*a*) position so that the secondary ramp 19 first extends to be coplanar with ramp 17, and thereafter the primary cylinder 21 via hydro line 21B is shortened in order to pivot the extended ramp structure downwardly about hinge axis 31 to the FIG. 4(*d*) position. Likewise, the ramp structure may be closed from its FIG. 4(*d*) position by first lengthening primary cylinder 21 via hydro line 21A until ramp 17 has pivoted to its closed position where it is approximately vertically oriented, and thereafter shortening secondary cylinder 23 via hydro line 23A to close secondary ramp 19.

Figure 5:
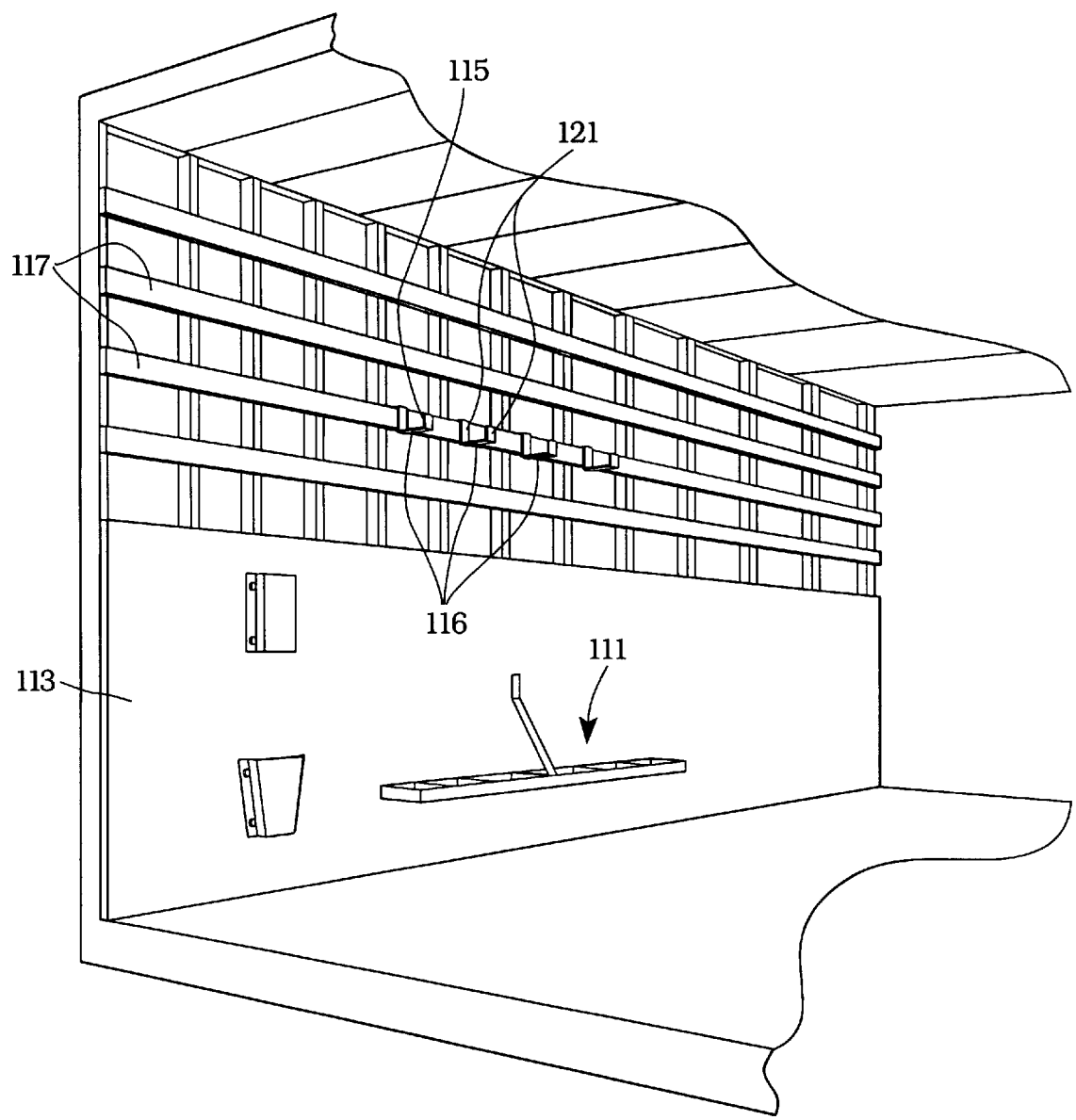
FIG. 5 is a fragmented perspective view of the interior of the truck of FIG. 1, illustrating a plurality of components which enable tools (e.g. rakes, shovels, sledge hammers, etc.) to be stored in the truck along with the lawn mowers so that the tools may be stored along and supported by walls of the bay while the mowers may be stored on the floor of the bay.

FIG. 5 illustrates the interior of bay 9 according to an embodiment of this invention. Upstanding walls of the bay interior include structure thereon for enabling hand tools (e.g. shovels, rakes, etc.) to be stored in an approximately vertically oriented manner during transport of the truck while the mowers are on the bay's floor. Elongated element 111 is attached to wall 113 directly below a plurality of brackets 115 that are hung on an elongated board 117. Elements 111 and 115 may be formed on bent strap iron/steel. Rakes may be stored/supported by elements 111, 115 in a head up position, while shovels may be stored/supported in a head down position. Rake handles or shovel handles can fit between the narrow slots. Hangers 116 can accept rakes, shovels, brooms, and the like by adjusting the width between adjacent hangers. The positioning of rakes in an upward position and shovels in a downward position is to minimize the amount of space taken up on the wall. For hard rakes, the handle is fit between a pair of dividers 119 of element 111, while the rake head (with raking elements thereon) sliding down onto the base 116 of U-shaped elements 115. Walls 121 keep the rake head from moving away from the wall and maintain it in storage position, while dividers 119 support and maintain the handle in position. Rakes are stored so that they are not in contact with the bay floor. Shovels may optionally be stored/supported by placing the handle end between two adjacent supports 115, and the shovel head end within an opening 123 in element 111. In other embodiments, handles may stay in place without the need for supports 115. Each opening if defined by a pair of elongated walls 125 and side walls 119, 127. The shovel head may be wedged into an opening 123 so that edges of the shovel rest upon walls 127. In other words, the shovel head is wedged between outer member 125 and wall 113. Walls 127 keep the shovel head from moving during stopping or starting of the truck.

Figure 6:
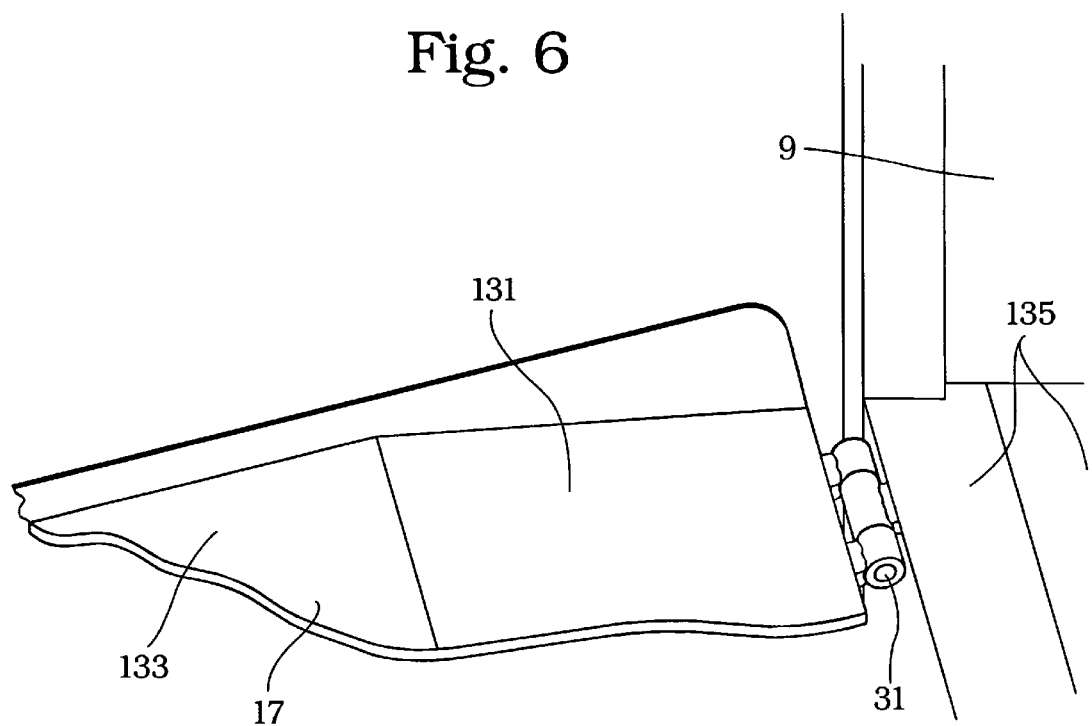
FIG. 6 is a fragmented perspective view of an angled portion of the primary ramp of FIGS. 1 and 4(a)–(d), wherein the angled portion of the ramp enables mowers to be driven into and out of the truck bay without scratching the ramp or bay floor.

FIG. 6 is a side view illustrating that the end 131 of ramp 17 closest to the truck bay forms an angle θ of from about 5°–40°, most preferably from about 20°–30°, with the rest or main portion 133 of ramp 17. Thus, ramp portions 131 and 133 are not coplanar. Thus, when the ramp is down, portion 131 forms an angle of from about 0 to 15 degrees with the floor 135 of the bay. This angle allows self-propelled lawn mowers, for example, which have cutter decks positioned low to the ground, to be moved up and down the ramp (into and out of the truck bay) without the cutter deck scrapping or scratching the upper surface of either the ramp, the truck bay, or the interface therebetween.

Figure 7:
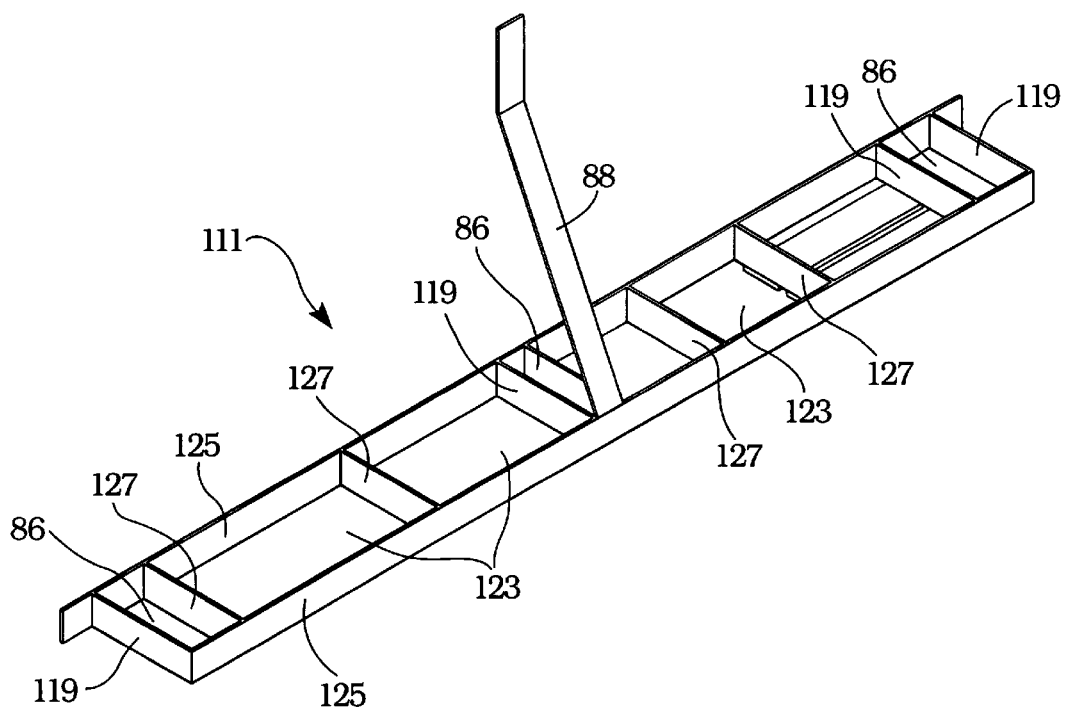
FIG. 7 is a perspective view of the elongated hanging element of FIG. 5, the element adapted to be hung on a vertical interior wall of the truck bay so as to enable hand tools to be supported thereby during storage.

FIG. 7 is a top view of the tool bracket element 111 illustrated in FIG. 5 being hung on the bay wall. It is noted that in certain preferred embodiments, extension 88, which is to be affixed to the wall, is offset to the right of small compartment 86 by approximately the width of the metal strap iron making up part 88 (e.g. by about 1.5 inches).

FIG. 8 is schematic diagram of the hydraulic system utilized to control the opening and closing of ramp structure 15, according to a single pump embodiment of this invention. Included are hydraulic pump assembly 91, twelve volt battery 93 for supplying dc current, built-in solenoid 95 for the electric motor, hydraulic cylinders 21 and 23, two spool control valve 94 for the pump, and hydraulic lines 21A, 21B, 23A and 23B for carrying hydraulic fluid. The hydraulic lines, as illustrated in FIG. 8, extend between the cylinders 21, 23 and ports in spool valve 94 to which levers 28, 29 are attached. Hydraulic lines 95A and 95B also extend between spool valve 94 and the hydraulic pump assembly 91. This system enables the operator, by way of levers 28 and 29, to control whether no fluid flows to/from cylinders 21, 23 (i.e. neutral or central lever position), whether hydraulic fluid flows into either one or both of the cylinders, or whether hydraulic fluid flows out of or from one or both of cylinders 21, 23. In such a manner, the operator may selectively extend or contract either of cylinders 21, 23, or alternatively may maintain them in a static position, as discussed above.

Figure 9:
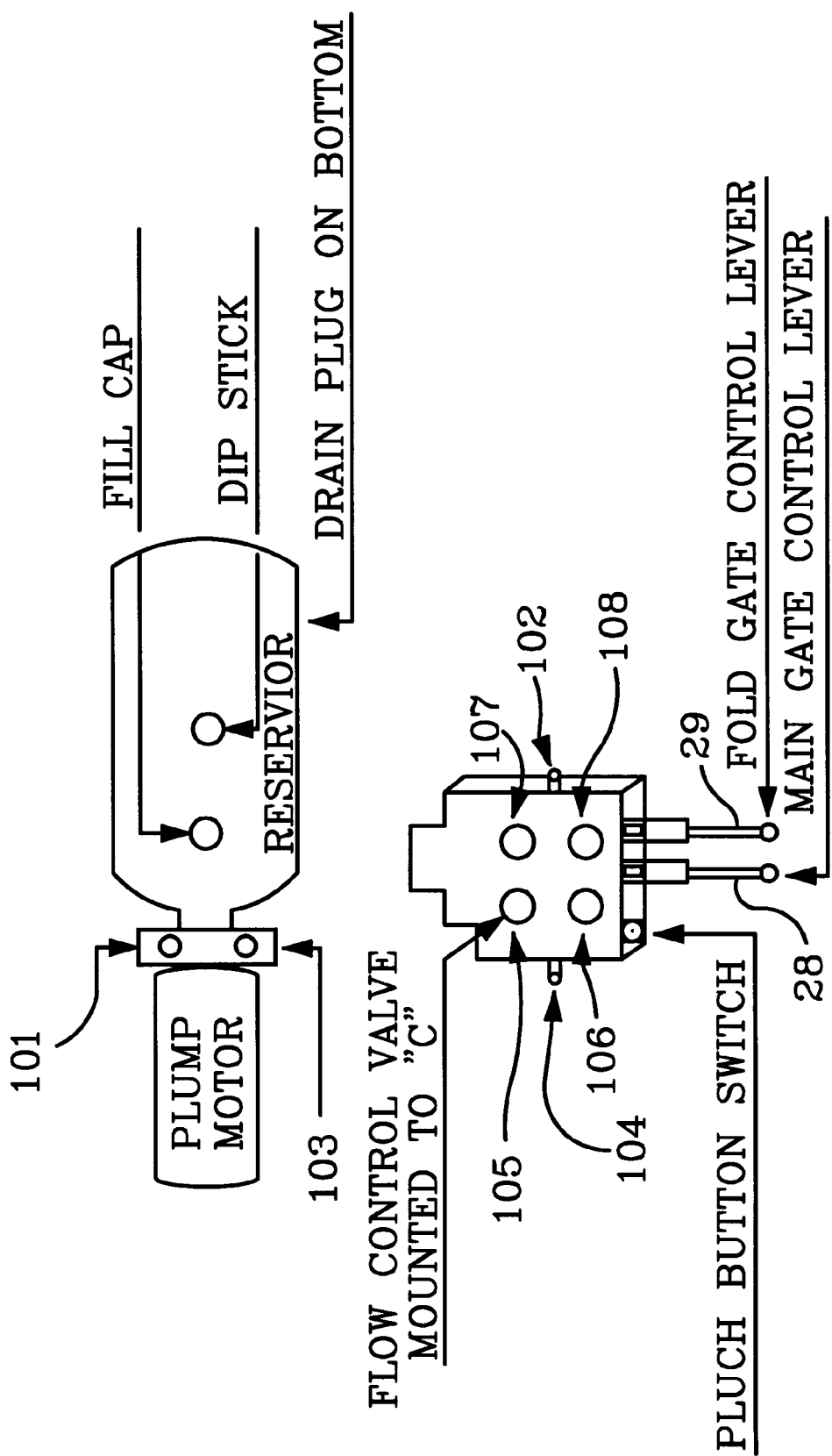
FIG. 9 is a block diagram of the hydraulic system of FIG. 8.

FIG. 9 is a schematic diagram illustrating hydraulic hose connections for use in the system of FIG. 8, which is in turn used to control the ramp apparatus of FIGS. 1 and 4(*a*)–4(*d*). As shown in FIG. 9, in an exemplary embodiment of this invention, a first hydraulic hose 95A (shown in FIG. 8) extends between port 101 (pressure out) at the pump motor to port 102 (pressure in) on the spool control valve 94. Another hose 95B (e.g. 24 inch hose) extends from port 103 (return pressure) at the pump motor to port 104 (return out) on the spool control valve. Another hose (e.g. 72 inch hose) extends from port 105 to the bottom port on main cylinder 21 (primary ramp up). Another hydraulic hose (e.g. 108 inch hose) extends from port 106 to the top port of cylinder 21 (primary ramp down). Another hose (e.g. 108 inch hose) extends from port 107 to the bottom port of cylinder 23 (secondary ramp out). Finally, another hydraulic hose extends from port 108 to the top port of cylinder 23 (secondary ramp in). These hoses, in a known manner, enable the cylinders to be selectively lengthened and shortened by the operator utilizing levers 28, 29.

Figure 10:
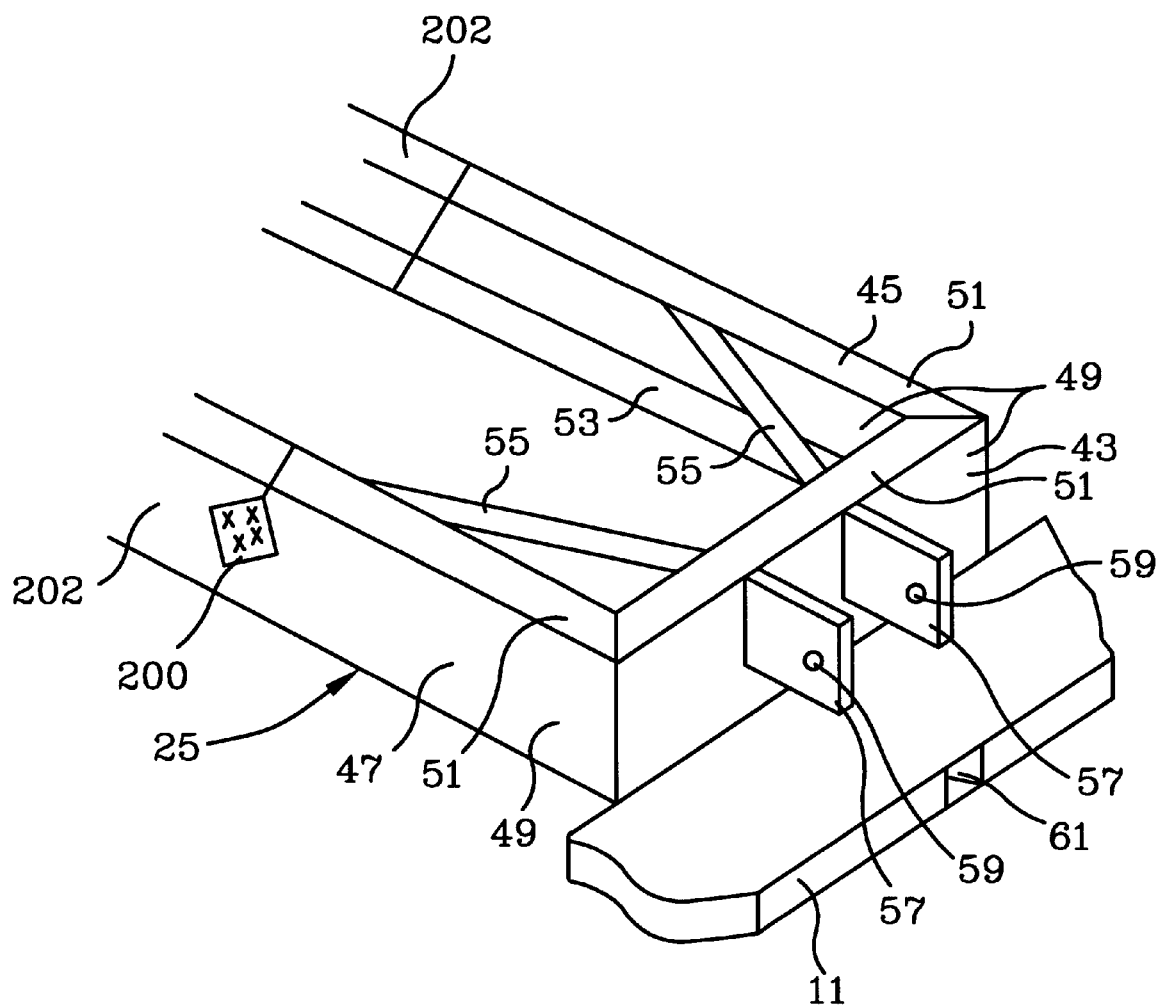
FIG. 10 is a perspective view of a frame extension assembly according to another embodiment of this invention, which may be used in conjunction with any embodiment herein.

FIG. 10 is a perspective view of a frame extension assembly 25 according to another embodiment of this invention. Reinforced steel plate 200 may be provided to increase strength of weld joints between truck frame rail 202 and members 47, 53, respectively.

Once given the above disclosure, many other features, modifications, and improvements will become apparent to the skilled artisan. Such other features, modifications, and improvements are, therefore, considered to be a part of this invention, the scope of which is to be determined by the following claims.

What is claimed is:

1. A truck including a ramp structure comprising:

a truck frame;

a truck bay including upstanding sidewalls and a roof, and a rear bay opening defined at a rearward portion of the bay;

a ramp structure pivotally connected to the truck at a rearward end thereof, the ramp structure comprising:

(a) a first ramp pivotally connected to the truck via at least one hinge;

(b) a second ramp pivotally connected to the first ramp, wherein the first ramp is substantially longer in length than the second ramp;

(c) a first hydraulic cylinder pivotally connected between a frame extension and the first ramp;

(d) a second hydraulic cylinder pivotally connected between the first and second ramps so as to allow the second ramp to be selectively moved between a folded up position and an extended position where the first and second ramps are approximately coplanar;

(e) the frame extension extending rearwardly of, and at an elevation below, a pivot axis defined by the at least one hinge that pivotally connects the first ramp to the truck, wherein a first cylinder pivot axis is defined where the first cylinder is pivotally connected to the frame extension, and wherein the first cylinder pivot axis is located rearwardly of and at an elevation below the at least one hinge that pivotally connects the first ramp to the truck; and (f) wherein the first ramp is selectively moveable by the first cylinder between (i) a closed position where the first cylinder closes the rear bay opening, and (ii) an open position for enabling self-propelled lawn mowers to be driven into and out of the bay.

2. The truck of claim 1, wherein said first ramp moves from the closed position toward its open position when the first cylinder contracts or shortens in length, and wherein the second ramp moves from the folded up position toward an extended position when the second cylinder extends in length.

3. The truck of claim 1, wherein said first ramp includes first and second portions which are angled relative to one another from about 5°–40°.

4. The truck of claim 3, wherein said first ramp includes first and second portions which are angled relative to one another from about 20°–30°.

5. A truck including a ramp structure comprising:

a truck frame;

a ramp structure pivotally connected to the truck at a rearward portion thereof, the ramp structure comprising:
- (a) a first ramp pivotally connected to the truck via at least one hinge;
- (b) a second ramp pivotally connected to the first ramp;
- (c) a first end of a first hydraulic cylinder pivotally connected to the first ramp and a second end of the first hydraulic cylinder defining a pivot point;
- (d) a second hydraulic cylinder pivotally connected between the first and second ramps so as to allow the second ramp to be selectively moved between a folded up position and an extended position;
- (e) the pivot point at the second end of the first cylinder being located rearwardly of, and at an elevation below, a pivotal connection between the first ramp and the truck; and
- (f) wherein the first ramp is selectively moveable by the first cylinder between (i) a closed approximately vertical position where the first cylinder closes the rear bay opening, and (ii) an open position for enabling vehicles to be driven into and out of the bay.

* * * * *